(12) United States Patent
Leeson (10) Patent No.: US 11,274,772 B2
(45) Date of Patent: Mar. 15, 2022

(54) CABLE CLIPS

(71) Applicant: PPC BROADBAND FIBER LTD., Woodbridge (GB)

(72) Inventor: Kim Leeson, Ipswich (GB)

(73) Assignee: PPC BROADBAND FIBER LTD., Woodbridge (GB)

(*) Notice: Subject to any disclaimer, the term of this patent is extended or adjusted under 35 U.S.C. 154(b) by 0 days.

(21) Appl. No.: 16/141,970

(22) Filed: Sep. 25, 2018

(65) Prior Publication Data

US 2019/0093792 A1 Mar. 28, 2019

Related U.S. Application Data

(60) Provisional application No. 62/563,057, filed on Sep. 25, 2017.

(51) Int. Cl.
*F16L 3/13* (2006.01)
*F16L 3/12* (2006.01)
*F16L 3/123* (2006.01)

(52) U.S. Cl.
CPC ............ *F16L 3/13* (2013.01); *F16L 3/1226* (2013.01); *F16L 3/1236* (2013.01)

(58) Field of Classification Search
CPC .......... F16L 3/13; F16L 3/1226; F16L 3/1236
USPC .......................................... 248/49, 55, 74.2
See application file for complete search history.

(56) References Cited

U.S. PATENT DOCUMENTS

| | | | | |
|---|---|---|---|---|
| 3,554,474 A | * | 1/1971 | Davies | F16L 3/00 248/49 |
| 4,927,103 A | * | 5/1990 | Nicholson | F16L 3/13 248/62 |
| 5,590,567 A | | 1/1997 | Marrs et al. | |
| 6,062,516 A | * | 5/2000 | Rizzo | F16L 3/13 248/316.7 |
| 7,389,961 B1 | * | 6/2008 | Haws | B05B 14/00 248/75 |
| 9,791,102 B2 | * | 10/2017 | Moreau | A44C 11/005 |
| 2008/0203247 A1 | * | 8/2008 | Hill | H01R 4/48 248/74.2 |
| 2016/0053918 A1 | * | 2/2016 | Flynn | F16L 3/13 248/68.1 |

(Continued)

FOREIGN PATENT DOCUMENTS

| EP | 1450090 A1 | 8/2004 |
|---|---|---|
| EP | 3203129 A1 | 8/2017 |

OTHER PUBLICATIONS

International Search Report and Written Opinion issued in corresponding International Patent Application No. PCT/B2018/001160 dated Jan. 3, 2019. (10 pages).

(Continued)

*Primary Examiner* — Muhammad Ijaz
(74) *Attorney, Agent, or Firm* — MH2 Technology Law Group LLP (57) ABSTRACT

A cable clip including a base member along a bottom of the cable clip and a pair of c-shaped holding members for receiving a cable. Each of the c-shaped holding members includes a circumferentially-extending raised rib on an inner surface thereof. The raised ribs are configured to engage corresponding grooves of a cable or duct to prevent relative sliding movement between the clip and the cable or duct in a longitudinal direction of the cable or duct.

20 Claims, 10 Drawing Sheets

(56) References Cited

U.S. PATENT DOCUMENTS

| | | | |
|---|---|---|---|
| 2016/0081236 A1* | 3/2016 | Kurita | F16B 2/245 |
| | | | 174/354 |
| 2016/0084603 A1* | 3/2016 | Michal | F41A 35/00 |
| | | | 42/94 |
| 2016/0114743 A1 | 4/2016 | Miyamoto et al. | |
| 2018/0128421 A1* | 5/2018 | Hilderman | F16B 2/22 |
| 2019/0190244 A1* | 6/2019 | Troughton | F16L 3/13 |

OTHER PUBLICATIONS

International Preliminary Report on Patentability issued in corresponding International Patent Application No. PCT/B2018/001160 dated Mar. 31, 2020. (8 pages).

* cited by examiner

CABLE CLIPS

BACKGROUND

The present disclosure is directed toward an apparatus for managing cables, wires, cords, and the like, and more particularly, to a cable clip for routing cables and wires.

There are many products available that assist in organizing, managing and routing wires. These products vary in form and composition. For example, "J" clips are conventionally used to retain cords, cables, and tubing. However, such "J" clips are fiddly, weak, and small. Further, "J" clips are difficult to install due to needing a hammer to insert a nail through the "J" clip and into the wall. Additionally, difficult installation is compounded by lack of space where the wall meets the ceiling, which is where such clips are normally installed.

Another simple cable organizer is the widely used nylon wire tie, having a head and a pawl that loops around the wires. A general-purpose nylon wire tie can group wires together and when used in conjunction with an adhesive backed mounting base, it can be used to anchor wires to a flat surface. However, a typical general-purpose nylon wire tie cannot be reused, because the head is self-locking and once the pawl is inserted into the head it is locked in and is cut off in order to remove the wire tie. A releasable cable tie has interlocking teeth along its pawl and is adjusted by depressing a tab connected to the head. The releasable cable tie can be reused, however, it is generally not compatible with an adhesive backed mounting base and thus cannot anchor wires to a flat surface.

Other commercially available cord clips used for organizing cables have an adhesive backed base and a retaining arm designed to hold cords. The use of a cord clip is advantageous over a releasable cable tie, in that the cord clip can attach cords to a flat surface in addition to organizing them. Additionally, cord clips that have thicker retaining arms are advantageous over general-purpose ties, as they partially cover the cords, thus allowing for slightly more stable positioning. However, cord clips are often very small and flimsy, and cannot hold large cords, cables, or tubing. Also, cord clips are difficult to handle, in that the rounded retaining arm of the clip is made of rigid plastic and has a small range of motion. This rigid structure can only be raised a rather limited amount and the cables inserted in the clip invariably are smaller in diameter than that of the clip. A cable that is slightly larger than the cord clip would have to be forced in to the clip, likely resulting in damage to the cable or breaking of the cord clip.

For each of the foregoing reasons, it may be desirable to provide a clip that securely holds a cable, a cord, a wire, or tubing. It may further be desirable to provide a clip that holds a cable, cord, wire, or tubing and resists relative sliding movement of the cable, core, wire, or tubing relative to the clip.

SUMMARY

According to various embodiments of the disclosure, a cable clip includes:

a base having a longitudinal dimension; and a pair of c-shaped holding members extending in a first direction from a first side of the base at opposite longitudinal ends of the base, wherein the holding members are spaced apart from one another in the longitudinal direction, wherein each of the holding members includes a pair of circumferentially-extending raised ribs on an inner surface thereof, wherein the raised ribs of each of the holding members is spaced apart from one another in the longitudinal direction and the raised ribs of one of the holding members are spaced apart from the raised ribs of other one of the holding members such that each of the raised ribs on each of the holding members is configured to contemporaneously engage a corresponding groove of a cable or duct to prevent relative sliding movement between the clip and the cable or duct in the longitudinal direction of the cable or duct, wherein each of the holding members includes a pair of arms that extend in the first direction from the first side of the base, and ends of each of the pair of arms are spaced apart from one another to define an opening configured to receive the cable or duct, and wherein each of the pairs of arms is configured to be flexible in order to allow the arms to move away from one another in a direction transverse to the longitudinal direction to enlarge the opening when a cable or duct is being inserted into the holding members while also preventing undesired and/or unintentional removal of the cable or duct from the holding members after installation of the clip.

According to various embodiments of the disclosure, a cable clip includes:

a base having a longitudinal dimension; and a pair of holding members extending in a first direction from a first side of the base at opposite longitudinal ends of the base, wherein the holding members are spaced apart from one another in the longitudinal direction, wherein each of the holding members includes at least one circumferentially-extending raised rib on an inner surface thereof, and wherein the at least one raised rib of one of the holding members is spaced apart from the at least one raise rib of the other one of the holding members in the longitudinal direction such that each of the raised ribs on each of the holding members is configured to contemporaneously engage a corresponding groove of a cable or duct to prevent relative sliding movement between the clip and the cable or duct in the longitudinal direction of the cable or duct.

According to various aspects of the disclosure, each of the holding members includes a pair of arms that extend in the first direction from the first side of the base, and ends of each of the pair of arms are spaced apart from one another to define an opening configured to receive the cable or duct.

According to various aspects of the disclosure, a cable clip includes:

each of the pairs of arms is configured to be flexible in order to allow the arms to move away from one another in a direction transverse to the longitudinal direction to enlarge the opening when a cable or duct is being inserted into the holding members while also preventing undesired and/or unintentional removal of the cable or duct from the holding members after installation of the clip.

According to various embodiments of the disclosure, a cable clip includes:

a base having a longitudinal dimension; and a pair of holding members at opposite longitudinal ends of the base, wherein each of the holding members includes a pair of circumferentially-extending raised ribs on an inner surface thereof, and wherein each one of the pair of raised ribs on one of the holding members is spaced apart from one another in the longitudinal direction such that each of the raised ribs on the one of the holding members is configured to contemporaneously engage a corresponding groove of a cable or duct to prevent relative sliding movement between the clip and the cable or duct in the longitudinal direction of the cable or duct.

According to various aspects of the disclosure, a cable clip includes:

each of the holding members includes a pair of arms that extend in the first direction from the first side of the base, and ends of each of the pair of arms are spaced apart from one another to define an opening configured to receive the cable or duct.

According to various aspects of the disclosure, a cable clip includes:

each of the pairs of arms is configured to be flexible in order to allow the arms to move away from one another in a direction transverse to the longitudinal direction to enlarge the opening when a cable or duct is being inserted into the holding members while also preventing undesired and/or unintentional removal of the cable or duct from the holding members after installation of the clip.

According to various aspects of the disclosure, a cable clip includes:

wherein each one of the pair of raised ribs on the other one of the holding members is spaced apart from one another in the longitudinal direction such that each of the raised ribs on the other one of the holding members is configured to contemporaneously engage a corresponding groove of a cable or duct to prevent relative sliding movement between the clip and the cable or duct in the longitudinal direction of the cable or duct.

DETAILED DESCRIPTION OF EMBODIMENTS

The present invention provides a cable clip for organizing and routing cables, wires, tubing, and the like. More particularly, the present invention satisfies the need for a product that provides for convenient organization of cables or tubing and that is also designed to route cables or tubing of varying sizes securely, allowing for stable routing at any desired angle. In the detailed description that follows, like element numerals are used to describe like elements shown in one or more of the figures.

Figure 1:
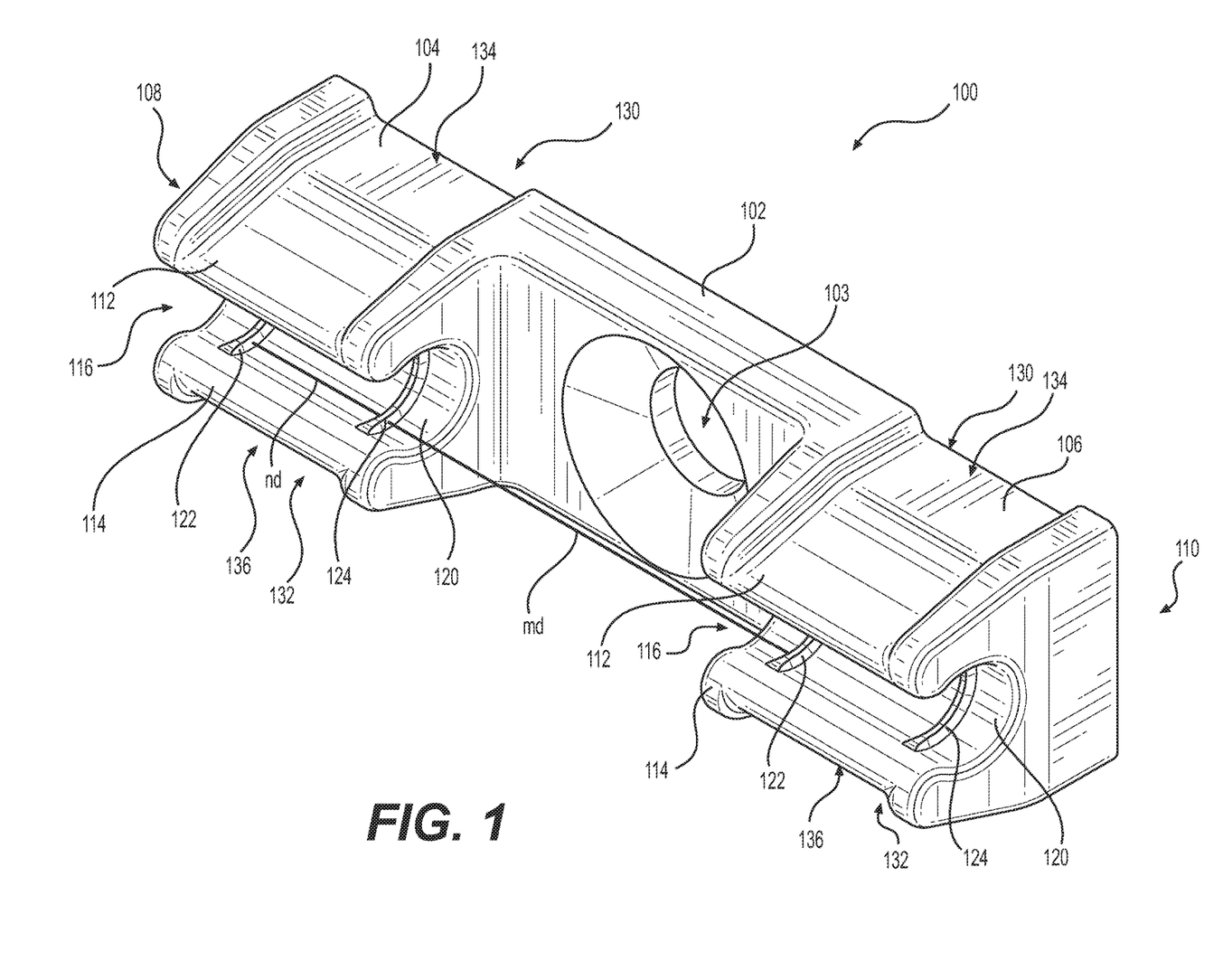
FIG. 1 is a perspective view of a first exemplary embodiment of a cable clip in accordance with various aspects of the disclosure.
Figure 2:
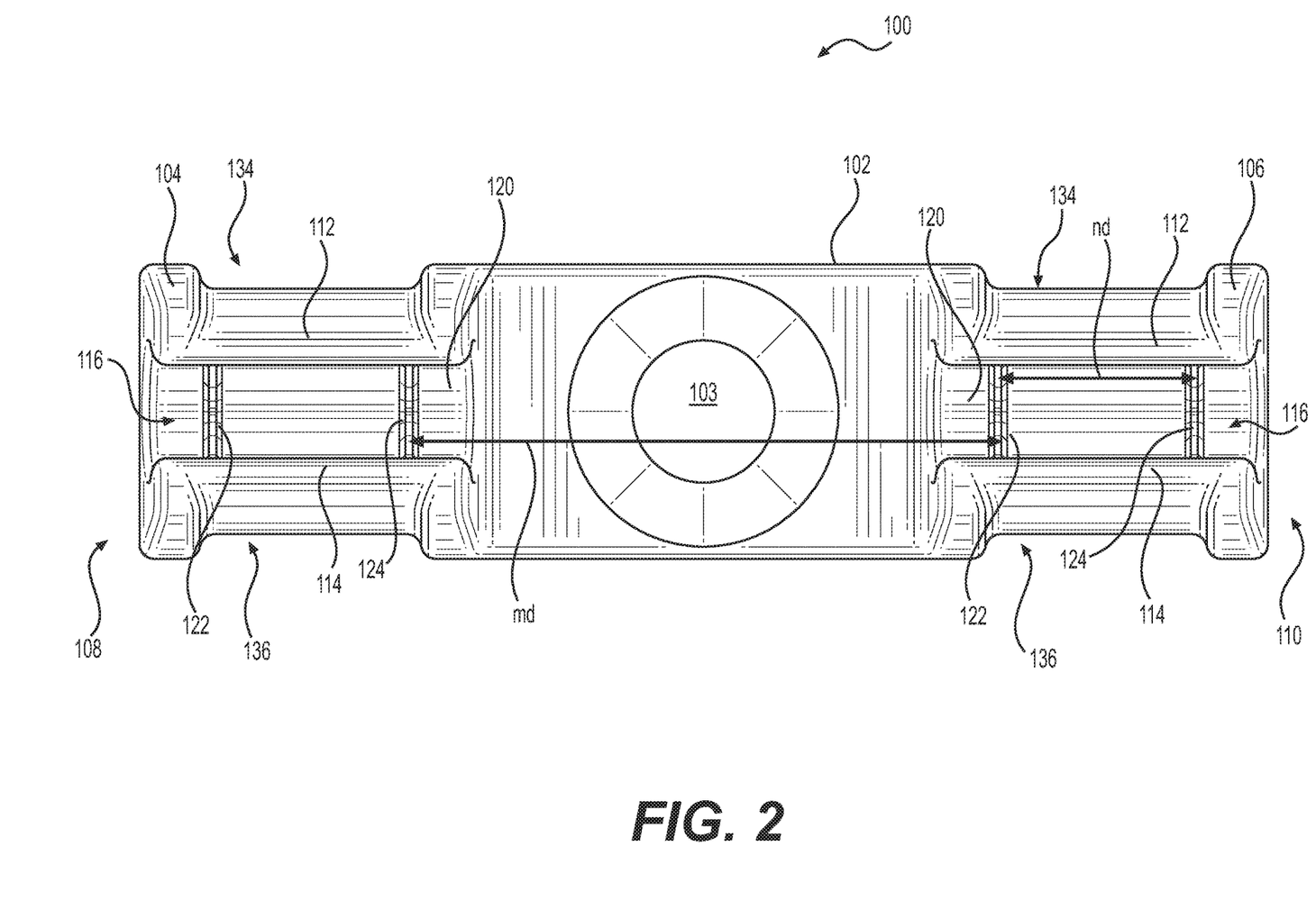
FIG. 2 is a front plan view of the cable clip of FIG. 1.

FIGS. 1 and 2 illustrate an exemplary cable clip 100. The cable clip 100 includes a base 102, which may be made, for example, from a relatively rigid material. The clip 100 includes two C-shaped holding members 104, 106 at opposite ends 108, 110 of the clip 100. The holding members 104, 106 are spaced apart from one another in a longitudinal direction. Each of the holding members 104, 106 includes a pair of arms 112, 114 extending from the base 102. In some embodiments, the holding members 104, 106 and the base 102 are a monolithic structure of unitary construction. The free ends of the arms 112, 114 are spaced from one another to provide an opening 116 for receiving a cable or a duct. The base 102 may include an opening 103 configured to receive a fastener, for example, a screw, to attach the clip 100 to a wall or other desired surface. Alternatively or additionally, a rear surface (not shown) of the base may include an adhesive layer (not shown) for attaching the clip 100 to a wall or other desired surface.

The arms 112, 114 of the holding members 104, 106 can be sized to accommodate a cable or duct having a desired diameter. For example, the holding members 104, 106 of the clip 100 may be configured to hold a cable having a 2 mm outside diameter, such as, for example, a 2 mm MiniFlex® flexible optical fiber cable.

The holding members 104, 106 may have an inner wall 120 that includes raised ribs 122, 124 extending in a circumferential direction of the holding members 104, 106 about at least a portion of the inner wall of the holding members. Although FIGS. 1 and 2 illustrate each holding member 104, 106 having two raised ribs, it should be understood that each holding member 104, 106 may include one raised rib or three or more raised ribs. The arms 112, 114 of the holding members 104, 106 may have outer walls 130, 132 that include a thinned region 134, 136, for example, in a longitudinal middle region of each of the walls of the holding members. The thinned regions 134, 136 may provide the arms 112, 114 with more flexibility to allow the arms 112, 114 to move away from one another to enlarge the opening 116 when a cable or duct is being inserted into the holding members 104, 106. The arms 112, 114 may be designed with a desired flexibility to accommodate insertion of the cable or duct while also preventing undesired and/or unintentional removal of the cable or duct from the holding members 104, 106 after installation of the clip 100.

Figure 10:
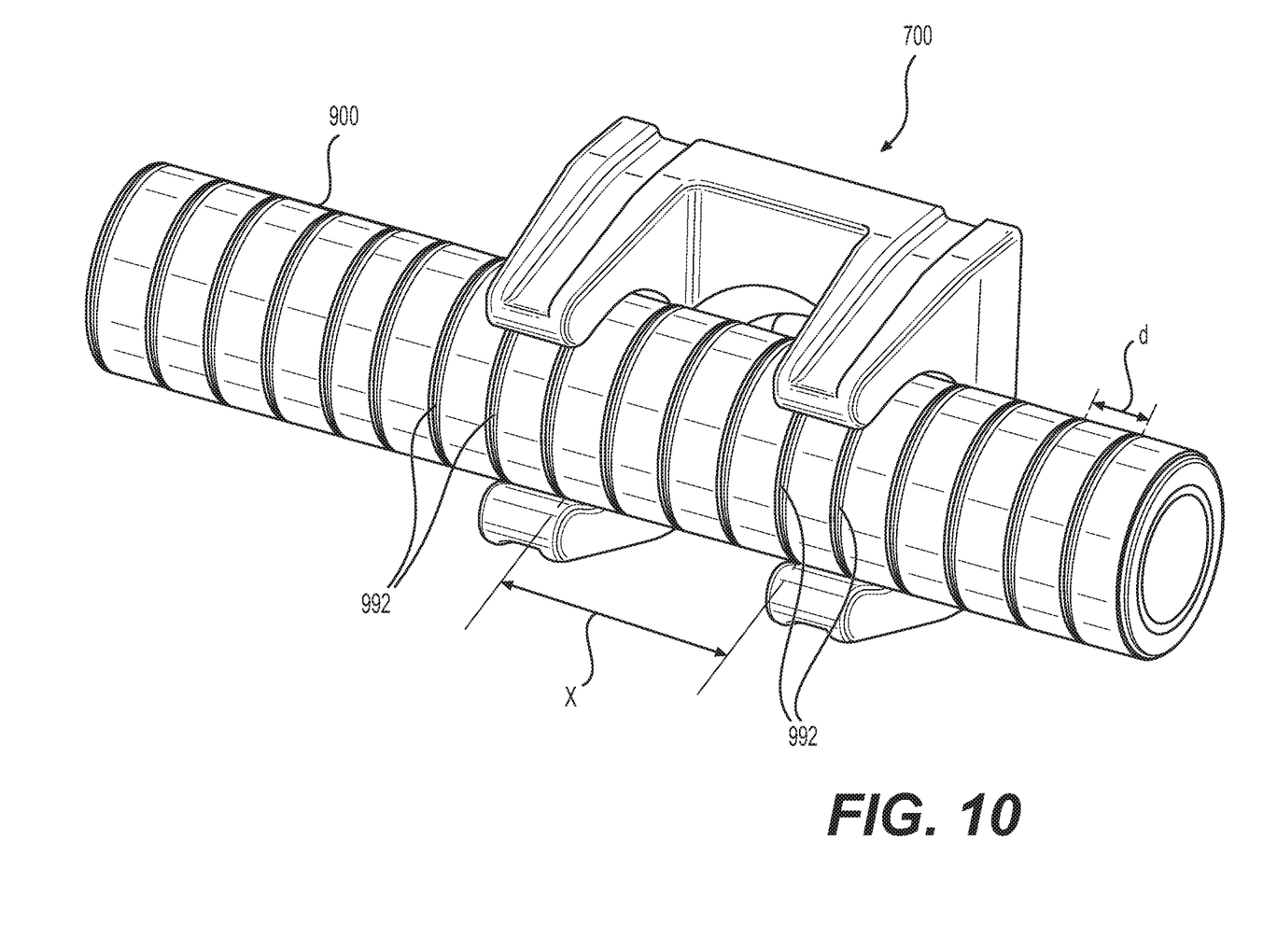
FIG. 10 shows the cable clip of FIG. 7 in combination with a cable or duct.

The raised ribs 122, 124 may be spaced apart in the longitudinal direction to match the longitudinal spacing of complementary grooves of a cable or duct, such as for example, a MiniFlex® grooved cable or duct. For example, the axial centers of the raised ribs 122, 124 may be spaced apart in the longitudinal direction by the same distance d as the distance d between the axial centers of consecutive grooves of the cable or duct in the longitudinal direction. Alternatively, the centers of raised ribs 122, 124 may be longitudinally spaced apart by a distance nd, where n is a whole number, and d is the distance between the centers of consecutive grooves of the cable or duct. Similarly, the axial center of the raised rib 124 of the holding member 104 that is nearest the holding member 106 is longitudinally spaced from the axial center of the raised rib 122 of the holding member 106 by a distance md, where m is a whole number, and d is the distance between consecutive grooves of the cable or duct. The longitudinal spacing of the raised ribs 122, 124 on the holding members 104, 106 and between the holding members 104, 106 allows each of the raised ribs 122, 124 to contemporaneously engage a respective groove in the cable or the duct. An example of a cable or duct being received by a cable clip in accordance with the disclosure is illustrated in FIG. 10, as described in more detail below.

Figure 3:
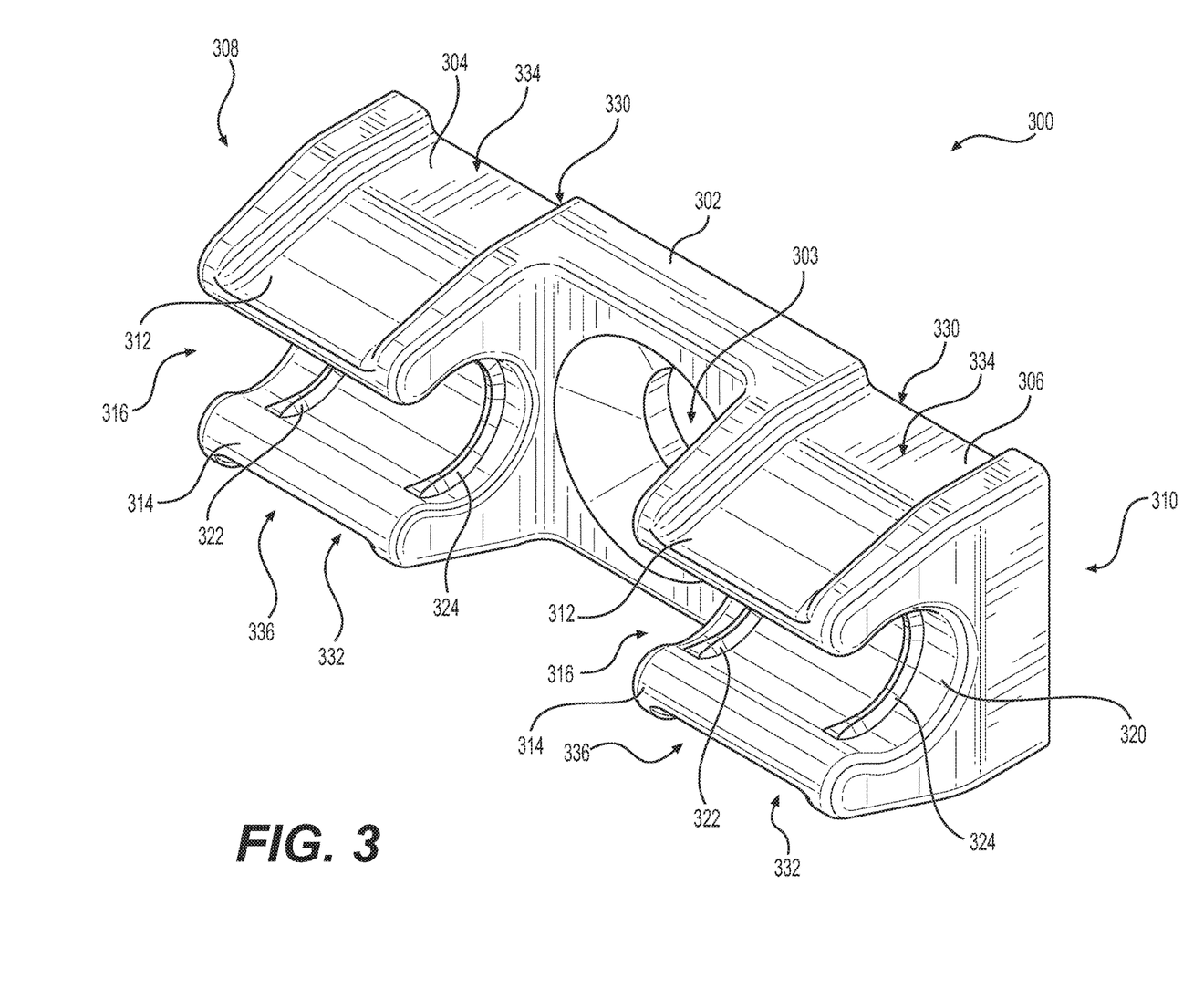
FIG. 3 is a perspective view of a second exemplary embodiment of a cable clip in accordance with various aspects of the disclosure.
Figure 4:
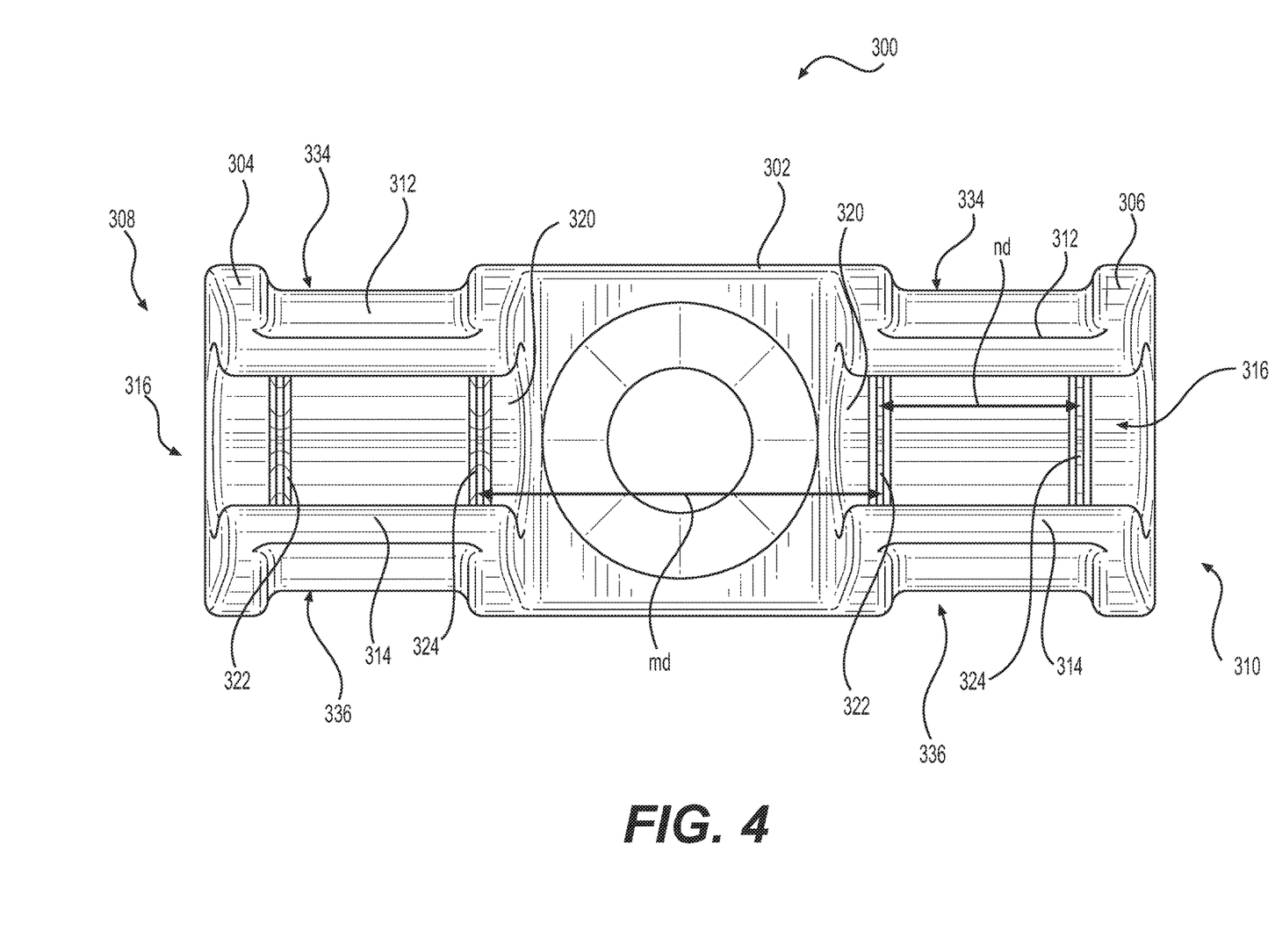
FIG. 4 is a front plan view of the cable clip of FIG. 3.

FIGS. 3 and 4 illustrate another exemplary cable clip 300. The cable clip 300 includes a base 302, which may be made, for example, from a relatively rigid material. The clip 300 includes two C-shaped holding members 304, 306 at opposite ends 308, 310 of the clip 300. The holding members 304, 306 are spaced apart from one another in a longitudinal direction. Each of the holding members 304, 306 includes a pair of arms 312, 314 extending from the base 302. In some embodiments, the holding members 304, 306 and the base 302 are a monolithic structure of unitary construction. The free ends of the arms 312, 314 are spaced from one another to provide an opening 316 for receiving a cable or a duct. The base 302 may include an opening 303 configured to receive a fastener, for example, a screw, to attach the clip 300 to a wall or other desired surface. Alternatively or additionally, a rear surface (not shown) of the base may include an adhesive layer (not shown) for attaching the clip 300 to a wall or other desired surface.

The arms 312, 314 of the holding members 304, 306 can be sized to accommodate a cable or duct having a desired diameter. For example, the holding members 304, 306 of the clip 300 may be configured to hold a cable having a 3 mm outside diameter, such as, for example, a 3 mm MiniFlex® flexible optical fiber cable.

The holding members 304, 306 may have an inner wall 320 that includes raised ribs 322, 324 extending in a circumferential direction of the holding members 304, 306 about at least a portion of the inner wall of the holding members. Although FIGS. 3 and 4 illustrate each holding member 304, 306 having two raised ribs, it should be understood that each holding member 304, 306 may include one raised rib or three or more raised ribs. The arms 312, 314 of the holding members 304, 306 may have outer walls 330, 332 that include a thinned region 334, 336, for example, in a longitudinal middle region of each of the walls of the holding members. The thinned regions 334, 336 may provide the arms 312, 314 with more flexibility to allow the arms 312, 314 to move away from one another to enlarge the opening 316 when a cable or duct is being inserted into the holding members 304, 306. The arms 312, 314 may be designed with a desired flexibility to accommodate insertion of the cable or duct while also preventing undesired and/or unintentional removal of the cable or duct from the holding members 304, 306 after installation of the clip 300.

The raised ribs 322, 324 may be spaced apart in the longitudinal direction to match the longitudinal spacing of complementary grooves of a cable or duct, such as for example, a MiniFlex® grooved cable or duct. For example, the axial centers of the raised ribs 322, 324 may be spaced apart in the longitudinal direction by the same distance d as the distance d between the axial centers of consecutive grooves of the cable or duct in the longitudinal direction. Alternatively, the centers of raised ribs 322, 324 may be longitudinally spaced apart by a distance nd, where n is a whole number, and d is the distance between the centers of consecutive grooves of the cable or duct. Similarly, the axial center of the raised rib 324 of the holding member 304 that is nearest the holding member 306 is longitudinally spaced from the axial center of the raised rib 322 of the holding member 306 by a distance md, where m is a whole number, and d is the distance between consecutive grooves of the cable or duct. The longitudinal spacing of the raised ribs 322, 324 on the holding members 304, 306 and between the holding members 304, 306 allows each of the raised ribs 322, 324 to contemporaneously engage a respective groove in the cable or the duct. An example of a cable or duct being received by a cable clip in accordance with the disclosure is illustrated in FIG. 10, as described in more detail below.

Figure 5:
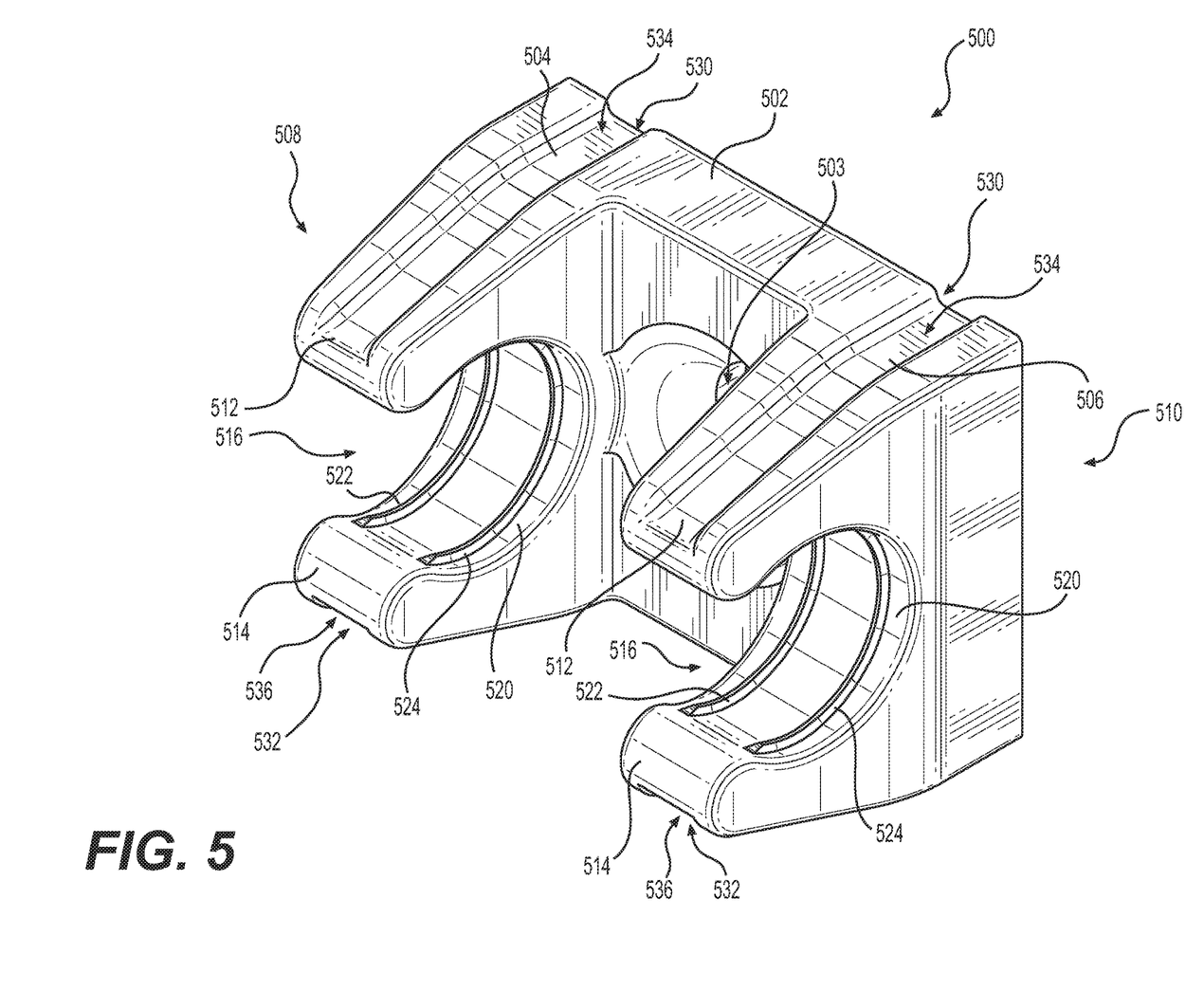
FIG. 5 is a perspective view of a third exemplary embodiment of a cable clip in accordance with various aspects of the disclosure.
Figure 6:
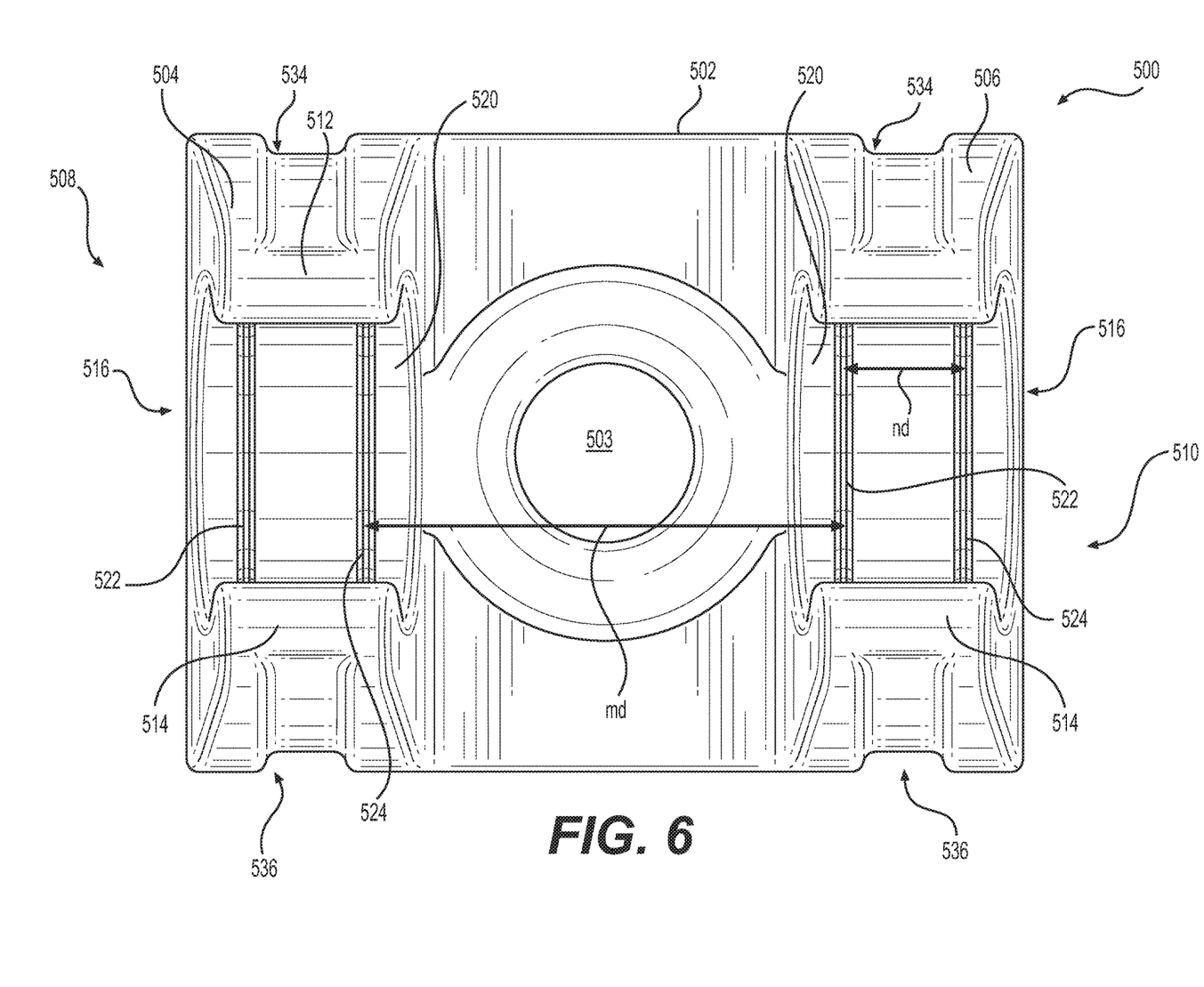
FIG. 6 is a front plan view of the cable clip of FIG. 5.

FIGS. 5 and 6 illustrate an exemplary cable clip 500. The cable clip 500 includes a base 502, which may be made, for example, from a relatively rigid material. The clip 500 includes two C-shaped holding members 504, 506 at opposite ends 508, 510 of the clip 500. Each of the holding members 504, 506 includes a pair of arms 512, 514 extending from the base 502. The holding members 504, 506 are spaced apart from one another in a longitudinal direction. In some embodiments, the holding members 504, 506 and the base 502 are a monolithic structure of unitary construction. The free ends of the arms 512, 514 are spaced from one another to provide an opening 516 for receiving a cable or a duct. The base 502 may include an opening 503 configured to receive a fastener, for example, a screw, to attach the clip 500 to a wall or other desired surface. Alternatively or additionally, a rear surface (not shown) of the base may include an adhesive layer (not shown) for attaching the clip 500 to a wall or other desired surface.

The arms 512, 114 of the holding members 504, 506 can be sized to accommodate a cable or duct having a desired diameter. For example, the holding members 504, 506 of the clip 500 may be configured to hold a cable having a 8 mm outside diameter, such as, for example, a 8 mm MiniFlex® microduct for receiving optical fiber cable.

The holding members 504, 506 may have an inner wall 520 that includes raised ribs 522, 524 extending in a circumferential direction of the holding members 504, 506 about at least a portion of the inner wall of the holding members. Although FIGS. 5 and 6 illustrate each holding member 504, 506 having two raised ribs, it should be understood that each holding member 504, 506 may include one raised rib or three or more raised ribs. The arms 512, 514 of the holding members 504, 506 may have outer walls 530, 532 that include a thinned region 534, 536, for example, in a longitudinal middle region of each of the walls of the holding members. The thinned regions 534, 536 may provide the arms 512, 514 with more flexibility to allow the arms 512, 514 to move away from one another to enlarge the opening 516 when a cable or duct is being inserted into the holding members 504, 506. The arms 512, 514 may be designed with a desired flexibility to accommodate insertion of the cable or duct while also preventing undesired and/or unintentional removal of the cable or duct from the holding members 504, 506 after installation of the clip 500.

The raised ribs 522, 524 may be spaced apart in the longitudinal direction to match the longitudinal spacing of complementary grooves of a cable or duct, such as for example, a MiniFlex® grooved cable or duct. For example, the axial centers of the raised ribs 522, 524 may be spaced apart in the longitudinal direction by the same distance d as the distance d between the axial centers of consecutive grooves of the cable or duct in the longitudinal direction. Alternatively, the centers of raised ribs 522, 524 may be longitudinally spaced apart by a distance nd, where n is a whole number, and d is the distance between the centers of consecutive grooves of the cable or duct. Similarly, the axial center of the raised rib 524 of the holding member 504 that is nearest the holding member 504 is longitudinally spaced from the axial center of the raised rib 522 of the holding member 506 by a distance md, where m is a whole number, and d is the distance between consecutive grooves of the cable or duct. The longitudinal spacing of the raised ribs 522, 524 on the holding members 504, 506 and between the holding members 504, 506 allows each of the raised ribs 522, 524 to contemporaneously engage a respective groove in the cable or the duct. An example of a cable or duct being received by a cable clip in accordance with the disclosure is illustrated in FIG. 10, as described in more detail below.

Figure 7:
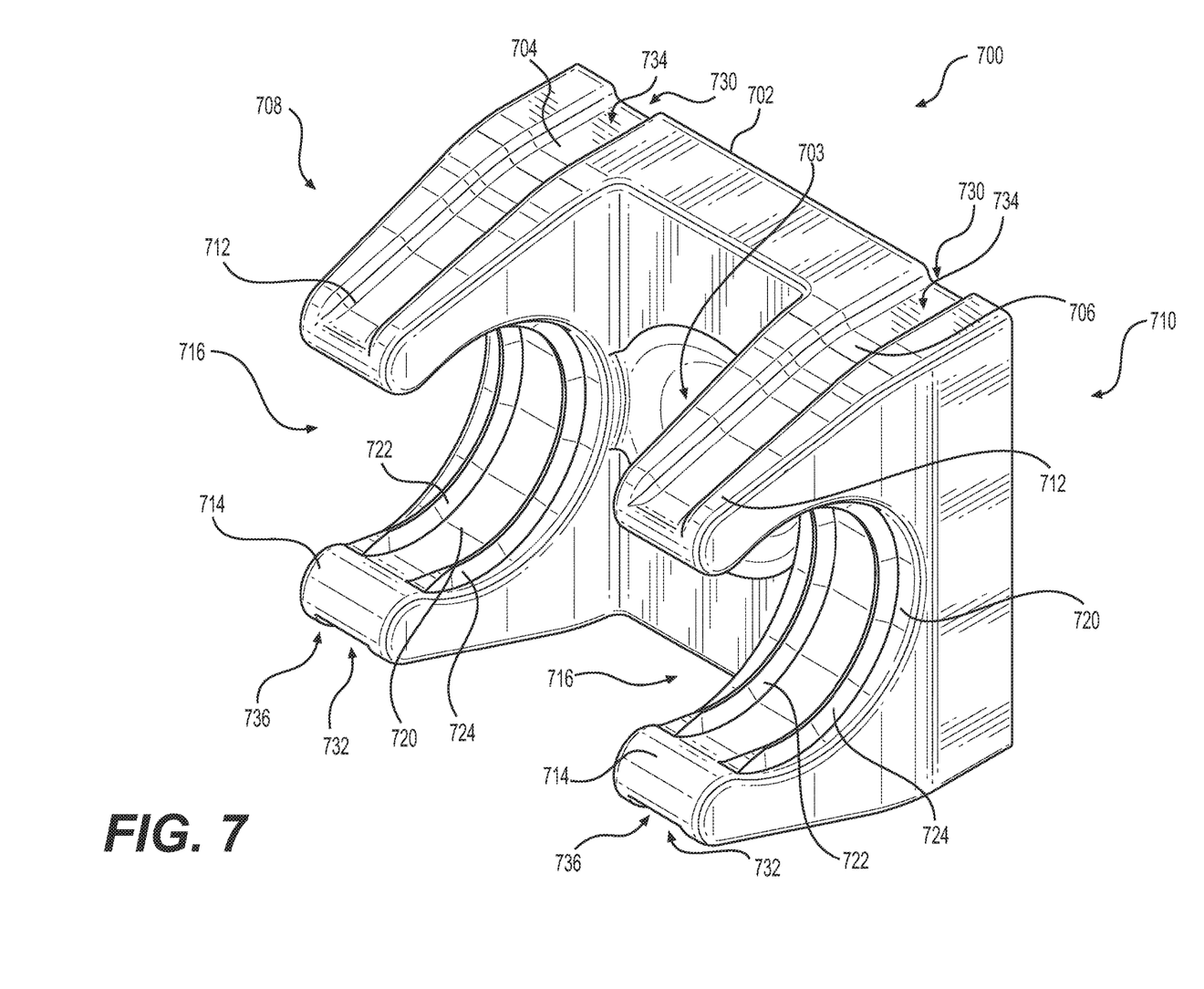
FIG. 7 is a perspective view of a fourth exemplary embodiment of a cable clip in accordance with various aspects of the disclosure.
Figure 8:
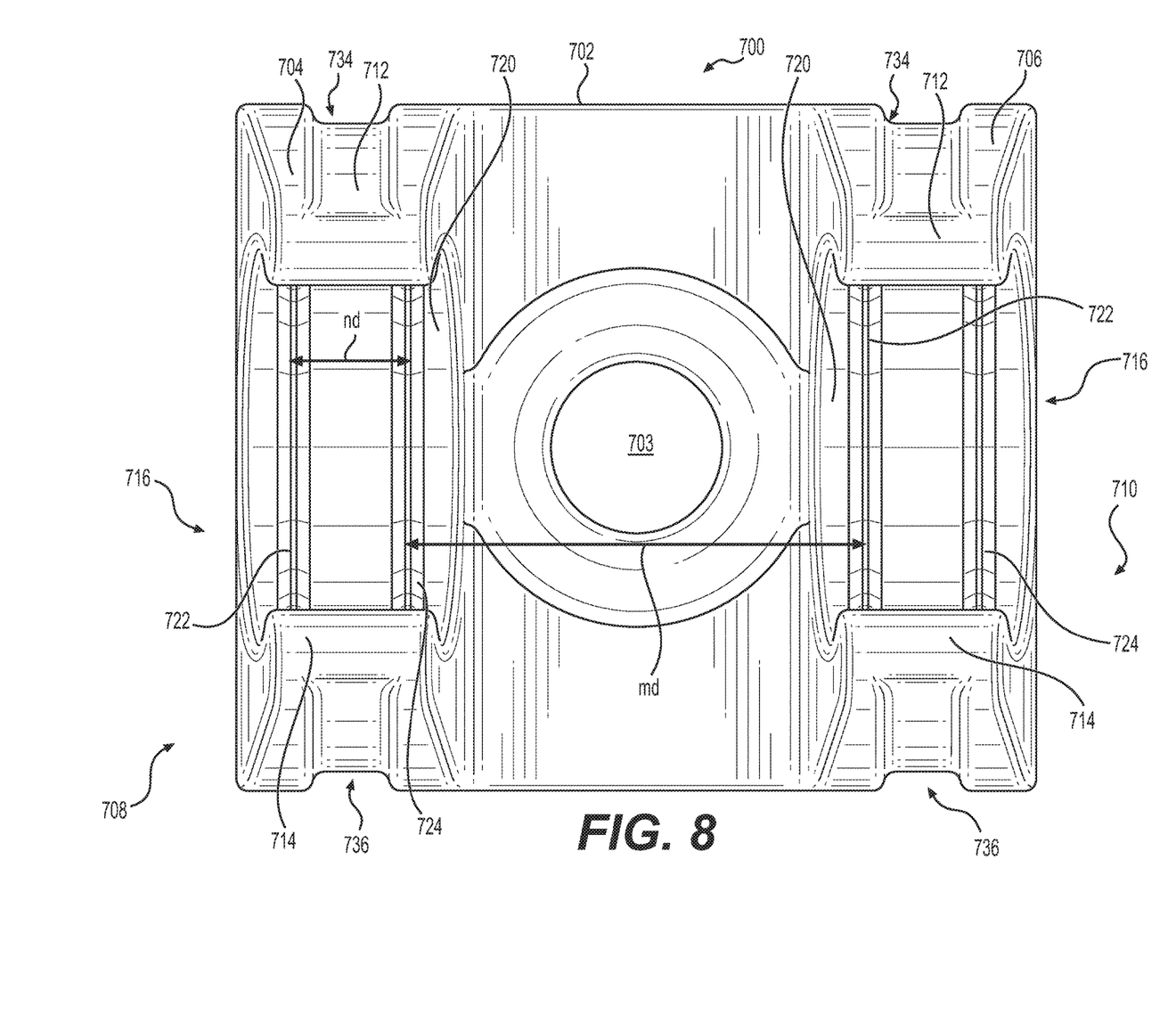
FIG. 8 is a front plan view of the cable clip of FIG. 7.
Figure 9A:
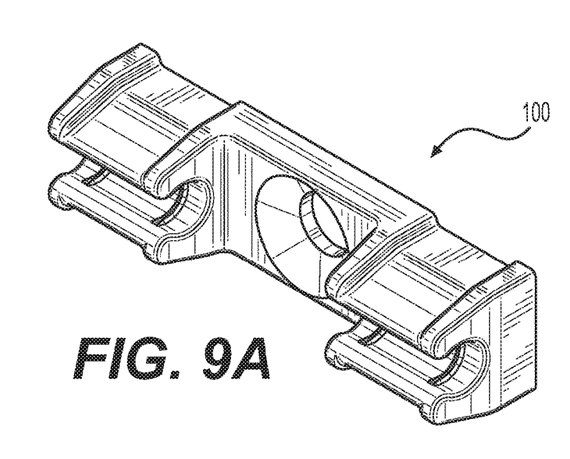
FIGS. 9A-9D are perspective views of the cable clips of FIGS. 1, 3, 5, and 7, respectively.
Figure 9B:
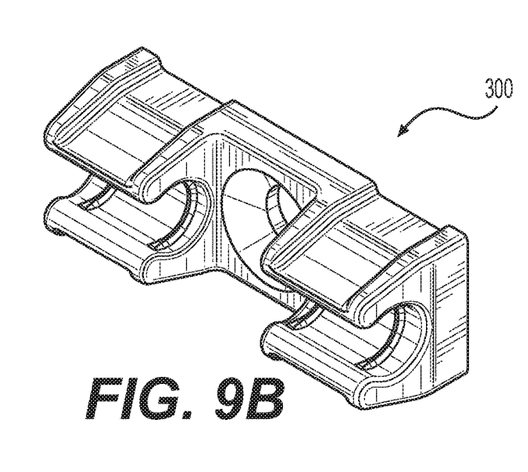
Figure 9C:
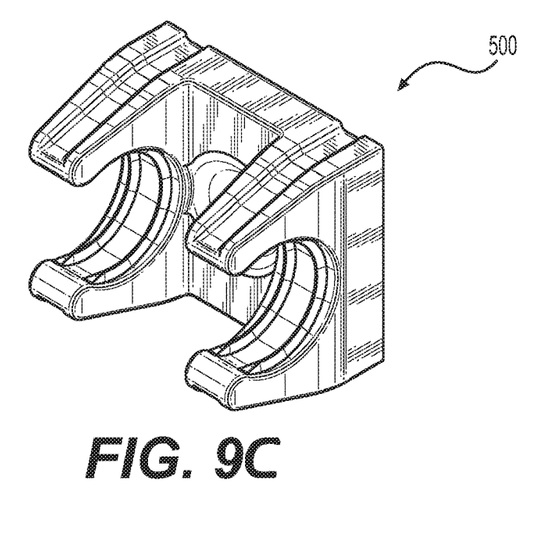
Figure 9D:
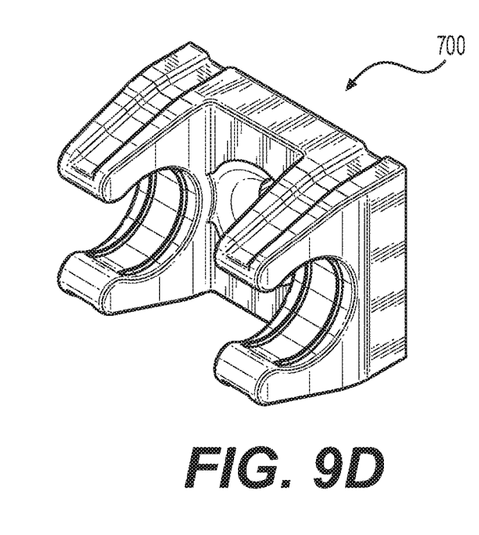

FIGS. 7 and 8 illustrate an exemplary cable clip 700. The cable clip 700 includes a base 702, which may be made, for example, from a relatively rigid material. The clip 700 includes two C-shaped holding members 704, 706 at opposite ends 708, 710 of the clip 700. Each of the holding members 704, 706 includes a pair of arms 712, 714 extending from the base 702. The holding members 704, 706 are spaced apart from one another in a longitudinal direction. In some embodiments, the holding members 704, 706 and the base 702 are a monolithic structure of unitary construction. The free ends of the arms 712, 714 are spaced from one another to provide an opening 716 for receiving a cable or a duct. The base 702 may include an opening 703 configured to receive a fastener, for example, a screw, to attach the clip 700 to a wall or other desired surface. Alternatively or additionally, a rear surface (not shown) of the base may include an adhesive layer (not shown) for attaching the clip 700 to a wall or other desired surface.

The arms 712, 714 of the holding members 704, 706 can be sized to accommodate a cable or duct having a desired diameter. For example, the holding members 704, 706 of the clip 700 may be configured to hold a cable having a 10 mm outside diameter, such as, for example, a 10 mm MiniFlex® microduct for receiving optical fiber cable.

The holding members 704, 706 may have an inner wall 720 that includes raised ribs 722, 724 extending in a circumferential direction of the holding members 704, 706 about at least a portion of the inner wall of the holding members. Although FIGS. 7 and 8 illustrate each holding member 704, 706 having two raised ribs, it should be understood that each holding member 704, 706 may include one raised rib or three or more raised ribs. The arms 712, 714 of the holding members 704, 706 may have outer walls 730, 732 that include a thinned region 734, 736, for example, in a longitudinal middle region of each of the walls of the holding members. The thinned regions 734, 736 may provide the arms 712, 714 with more flexibility to allow the arms 712, 714 to move away from one another to enlarge the opening 716 when a cable or duct is being inserted into the holding members 704, 706. The arms 712, 714 may be designed with a desired flexibility to accommodate insertion of the cable or duct while also preventing undesired and/or unintentional removal of the cable or duct from the holding members 704, 706 after installation of the clip 700.

The raised ribs 722, 724 may be spaced apart in the longitudinal direction to match the longitudinal spacing of complementary grooves of a cable or duct, such as for example, a MiniFlex® grooved cable or duct. For example, the axial centers of the raised ribs 722, 724 may be spaced apart in the longitudinal direction by the same distance d as the distance d between the axial centers of consecutive grooves of the cable or duct in the longitudinal direction. Alternatively, the centers of raised ribs 722, 724 may be longitudinally spaced apart by a distance nd, where n is a whole number, and d is the distance between the centers of consecutive grooves of the cable or duct. Similarly, the axial center of the raised rib 724 of the holding member 704 that is nearest the holding member 706 is longitudinally spaced from the axial center of the raised rib 722 of the holding member 706 by a distance md, where m is a whole number, and d is the distance between consecutive grooves of the cable or duct. The longitudinal spacing of the raised ribs 722, 724 on the holding members 704, 706 and between the holding members 704, 706 allows each of the raised ribs 722, 724 to contemporaneously engage a respective groove in the cable or the duct.

Referring to FIGS. 9A-9D, the cable clips 100, 300, 500, 700 are illustrated for comparison purposes. As shown, the clips 100, 300, 500, 700 can be dimensioned and proportioned to optimize their use with the various sizes of cables or ducts.

Referring now to FIG. 10, the clip 700 is shown in combination with a grooved duct 990, such as for example, a 10 mm MiniFlex® microduct. The duct 900 includes groove 992 having centers that are spaced apart by a distance d. As illustrated, the raised ribs 722, 724 of the holding member 704 engage with adjacent grooves 992 and the raised ribs 722, 724 of the holding member 706 engage with adjacent grooves 992. The raised rib 724 of the holding member 704 engages with a groove 992 that is spaced apart from a groove engaged by the raised rib 722 of the holding member 706 by a distance x that is spaced apart by a distance four times the distance d between adjacent grooves 992.

It is readily apparent that the present invention solves the problems posed by the prior art and overcomes their disadvantages. For example, the aforementioned clips have raised ribs that engage with grooves of a cable or duct held by the clips. The ribs and grooves cooperate to hold the cable or duct in a fixed position while preventing the cable or duct from sliding relative to the clips in a longitudinal direction of the cable or duct. Thus, the clips can be used to hold the cable or duct at any orientation, including vertical, horizontal, and any angle there between, while maintain the position of the cable or duct without slippage. The clips also hold s the wires safely and securely and the base 102 allows for better anchoring to flat surfaces as compared to the prior art.

Having thus described several embodiments of a cable clip and system used to organize, manage, and routes cables and wires, it should be apparent to those skilled in the art that certain advantages of the within cable clip and system have been achieved. It should also be appreciated that various modifications, adaptations, and alternative embodiments thereof may be made within the scope and spirit of the present invention. It should be apparent that many of the inventive steps described above would be equally applicable to other cable clips.

What is claimed is:

1. A cable clip, comprising:
   a base having a longitudinal dimension;
   a pair of c-shaped holding members extending in a first direction from a first side of the base at opposite longitudinal ends of the base:
   wherein the holding members and the base are a monolithic structure of unitary construction;
   wherein the holding members are spaced apart from one another in the longitudinal direction;
   wherein each of the holding members includes an inner wall having a pair of raised ribs extending from the inner wall in a circumferential direction of each of the respective holding members;
   wherein the raised ribs of each of the holding members are spaced apart from one another in the longitudinal direction and the raised ribs of one of the holding members are spaced apart from the raised ribs of other one of the holding members such that each of the raised ribs on each of the holding members is configured to engage a groove of a cable or duct to prevent relative movement between the clip and the cable or duct in the longitudinal direction of the cable or duct, wherein each of the holding members includes a pair of arms that extend in the first direction from the first side of the base, and free ends of each of the arms are spaced apart from one another in a second direction to define an opening, the second direction being perpendicular to the first direction and the longitudinal direction;

wherein the openings of the holding members are aligned with one another in the longitudinal direction;

wherein opposed surfaces of the inner wall of each of the holding members are spaced apart by a distance in the second direction that is greater than a distance between the spaced apart free ends of the arms in the second direction;

wherein each of the arms is configured to be flexible to allow the arms to move away from one another in the second direction to enlarge the opening to receive a cable or duct; and wherein the pairs of arms are configured to prevent undesired and/or unintentional removal in the first direction a cable or duct held by the holding members.

2. The cable clip of claim 1,
wherein each of the holding members defines a passageway extending in the longitudinal direction, the passageways being aligned with one another and configured to receive a cable or duct that extends in the longitudinal direction from a first one of the pair of holding members to a second one of the pair of holding members.

3. The cable clip of claim 1,
wherein the radially inner edges of the pair of circumferentially-extending raised ribs each define a portion of a circle having an inner diameter that is less than the inner diameter of the pair of arms.

4. The cable clip of claim 1,
wherein the radially inner edges of the pair of circumferentially-extending raised ribs each define a portion of a circle having an inner diameter that is less than the inner diameter of the pair of arms.

5. The cable clip of claim 4,
wherein the dimension of the opening extending from the end of the first one of the pair of arms to the end of the second one of the pair of arms is less than the inner diameter defined by the raised ribs.

6. The cable clip of claim 1,
wherein the radially inner edges of the pair of circumferentially-extending raised ribs each define a portion of a circle having an inner diameter that is less than the inner diameter of the pair of arms.

7. A cable clip, comprising:
a base having a longitudinal dimension; and
a pair of holding members extending in a first direction from a first side of the base at opposite longitudinal ends of the base; wherein the holding members and the base are a monolithic structure of unitary construction;

wherein the holding members are spaced apart from one another in the longitudinal direction;

wherein each of the holding members includes a pair of arms that extend in the first direction from the first side of the base, and ends of each of the pair of arms are spaced apart from one another in a second direction to define an opening, the second direction being perpendicular to the first direction and the longitudinal direction;

wherein the openings of the holding members are aligned with one another in the longitudinal direction;

wherein each of the holding members are aligned with one another in the longitudinal direction;

wherein each of the holding members includes an inner wall having at least one raised rib extending from the inner wall in a circumferential direction of each of the respective holding members;

wherein the at least one raised rib of one of the holding members is spaced apart from the at least one raised rib of the other one of the holding members in the longitudinal direction such that each of the raised ribs on each of the holding members is configured to engage a groove of a cable or duct to prevent relative movement between the clip and the cable or duct in the longitudinal direction of the cable or duct;

wherein opposed surfaces of the inner wall of each of the holding members are spaced apart by a distance in the second direction that is greater than a distance between the spaced apart free ends of the arms in the second direction; and wherein the pairs of arms are configured to prevent undesired and/or unintentional removal in the first direction of a cable or duct held by the holding members.

8. The cable clip of claim 7,
wherein each of the arms is configured to be flexible to allow the arms to move away from one another in the second direction to enlarge the opening to receive a cable or duct.

9. The cable clip of claim 7,
wherein each of the holding members defines a passageway extending in the longitudinal direction, the passageways being aligned with one another and configured to receive a cable or duct that extends in the longitudinal direction from a first one of the pair of holding members to a second one of the pair of holding members.

10. A cable clip, comprising:
a base having a longitudinal dimension;
a pair of holding members extending from the base in a first diction at opposite longitudinal ends of the base;
wherein the holding members and the base are a monolithic structure of unitary construction;

wherein each of the holding members defines a passageway extending in the longitudinal direction, the passageways being aligned with one another in the longitudinal direction;

wherein each of the holding members includes an inner wall having at least one raised rib extending from the inner surface wall in a circumferential direction of each of the respective holding members;

wherein each one of the pair of raised ribs on one of the holding members is spaced apart from one another in the longitudinal direction such that each of the raised ribs on the one of the holding members is configured to engage a groove of a cable or duct to prevent relative movement between the clip and the cable or duct in the longitudinal direction of the cable or duct; and wherein the pairs of arms are configured prevent undesired and/or unintentional removal in the first direction of a cable or duct held by the holding members.

11. The cable clip of claim 10,
wherein ends of each of the pair of arms are spaced apart from one another by a distance in a second direction to define an opening, the second direction being perpendicular to the first direction and the longitudinal direction.

12. The cable clip of claim 11,
wherein each of the arms is configured to be flexible to allow the arms to move away from one another in the second direction to enlarge the opening to receive a cable or duct.

13. The cable clip of claim 12,
wherein opposed surfaces of the inner wall of each of the holding members are spaced apart by a distance in the second direction that is greater than a distance between the spaced apart free ends of the arms in the second direction.

14. The cable clip of claim 11,
wherein the openings of the holding members are aligned with one another in the longitudinal direction.

15. The cable clip of claim 11,
wherein opposed surfaces of the inner wall of each of the holding members are spaced apart by a distance in the second direction that is greater than a distance between the spaced apart free ends of the arms in the second direction.

16. The cable clip of claim 10,
wherein each one of the pair of raised ribs on the other one of the holding members is spaced apart from one another in the longitudinal direction such that each of the raised ribs on the other one of the holding members is configured to engage a groove of a cable or duct to prevent relative movement between the clip and the cable or duct in the longitudinal direction of the cable or duct.

17. The cable clip of claim 5,
wherein each of the arms extends in the first direction from the first side of the base to define the passageway.

18. The cable clip of claim 17,
wherein ends of each of the pair of arms are spaced apart from one another by a distance in a second direction to define an opening configured to receive the cable or duct, the second direction being perpendicular to the first direction and the longitudinal direction.

19. The cable clip of claim 18,
wherein opposed surfaces of the inner wall of each of the holding members are spaced apart by a distance in the second direction that is greater than a distance between the spaced apart free ends of the arms in the second direction.

20. The cable clip of claim 18,
wherein the openings of the holding members are aligned with one another in the longitudinal direction.

\* \* \* \* \*